Aug. 13, 1968    L. F. GUYOT ET AL    3,397,341
BIAXIAL ELECTROSTATIC DEFLECTOR
Filed April 11, 1966                    7 Sheets-Sheet 1
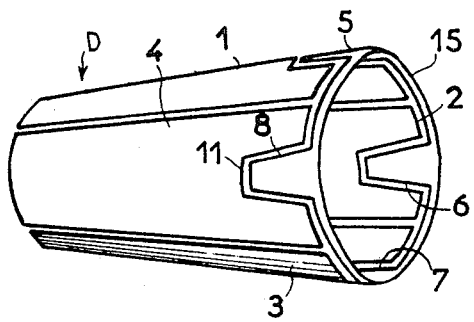
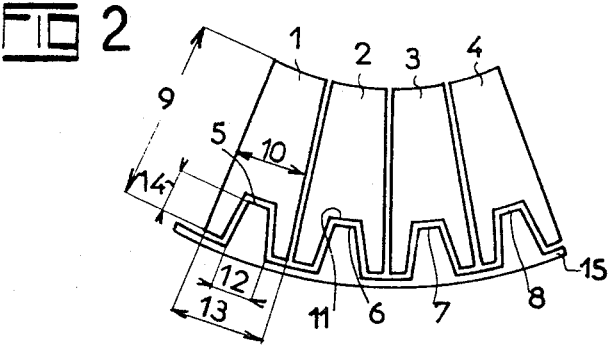
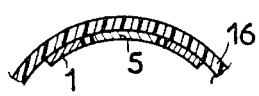
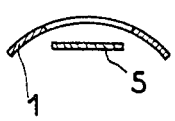

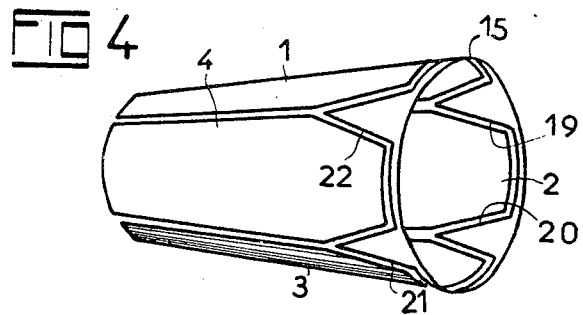
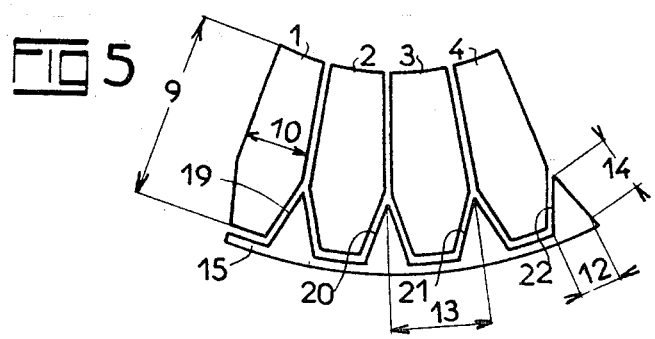
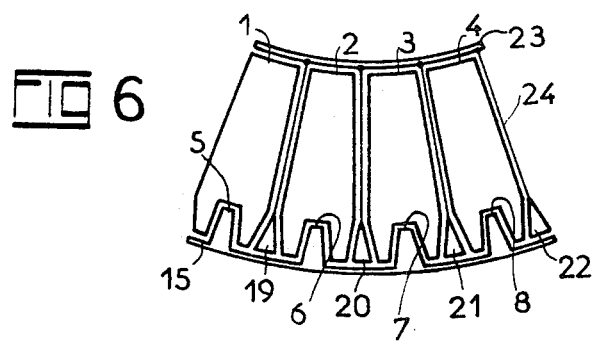

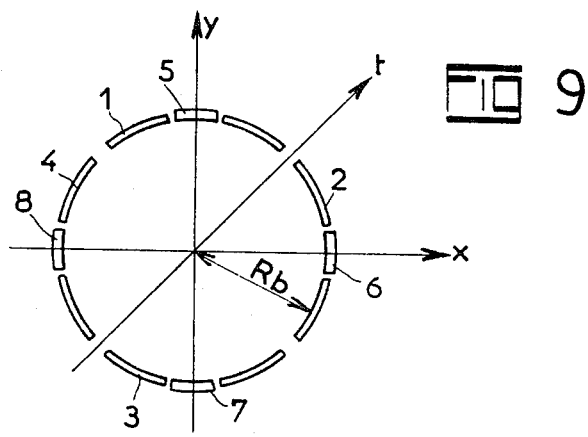
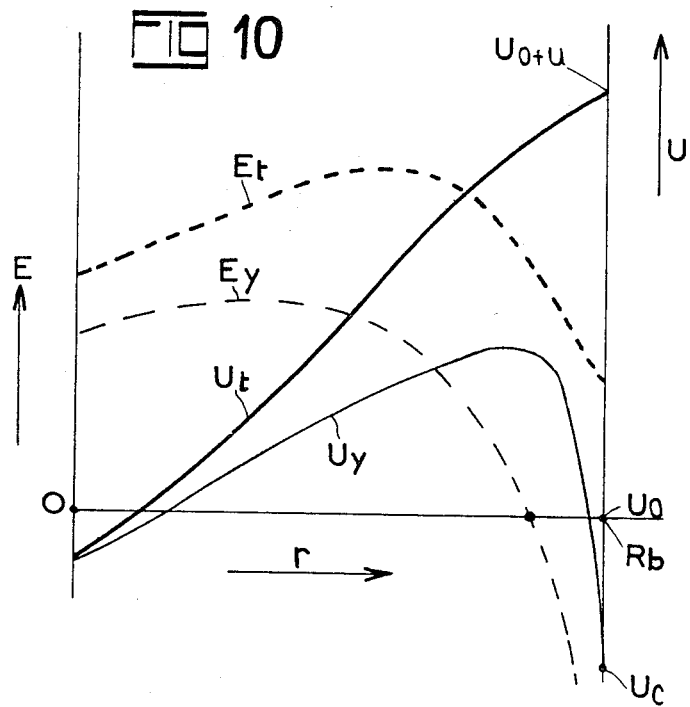

United States Patent Office 3,397,341
Patented Aug. 13, 1968

3,397,341
BIAXIAL ELECTROSTATIC DEFLECTOR
Lucien F. Guyot, Paris, and Gèrard F. Peres, Villepreux, France, assignors to Compagnie Francaise Thomson Houston-Hotchkiss Brandt, Paris, France, a corporation of France
Filed Apr. 11, 1966, Ser. No. 541,675
Claims priority, application France, Apr. 20, 1965, 13,771
14 Claims. (Cl. 315—17)

ABSTRACT OF THE DISCLOSURE

Improved biaxial electrostatic deflection device including two pairs of opposed main deflection plates and a compensating electrode. The compensating electrode has portions circumferentially interspersed with the main plates at the beam-exit end of the device. Deflection potentials are connected to the main deflection plates serving to deflect an electron beam in mutually orthogonal directions and a common potential is connected to the compensating electrode to create correcting fields imparting corrective deflections to the particles whereby the resulting overall deflections will simulate the vector sums of the deflections produced by said main plates in said respective orthogonal directions.

---

This invention relates to electrostatic deflector devices for charged particles, of the type extensively used inter alia for controlling the deflection of an electron beam in cathode ray tubes, as embodied in a wide variety of equipment, including oscilloscopes, television cameras and projectors, radar displays and many other instruments.

For convenience, the ensuing description will refer primarily to such cathode ray tube applications, but it should be distinctly understood that the invention is broadly applicable to systems for controlling the deflection of any stream of electrically charged particles not necessarily electrons.

As is well known, two broad classes of deflection systems are currently used for controlling the deflection of a beam of electrons in two mutually orthogonal directions, viz. electromagnetic and electrostatic deflectors. In the electromagnetic device sets of electromagnetic windings are used to create two mutually orthogonal electromagnetic field components which combine vectorially into a resultant field that imparts the controllable deflection to the electrons. In the conventional electrostaic deflector, there are provided two crossed pairs of opposed plate electrodes axially displaced along the path of travel of the electrons to impart the desired deflection first in one direction and then in a second direction orthogonal to the first.

The simultaneous action of the electromagnetic windings in deflecting the beam directly in the desired angular direction, as opposed to the sequential action of the crossed electrostatic plates, is a distinct advantage of the electromagnetic deflectors. Nevertheless, the electrostatic system has advantages of its own, including especially its high-voltage, low-current characteristic and its low weight, which render it irreplaceable for many important applications. It would, therefore, be extremely desirable to provide a so-called "biaxial" electrostatic deflection system capable of simulating the direct vector-summation action that characterizes the electromagnetic type of operation.

Various attempts have been made in this direction, but to the best of the applicants' knowledge none has been fully satisfactory or has succeeded in superseding the time-honored crossed-plate deflector despite the indubitable disadvantages of the latter's sequential action.

These disadvantages include unequal deflection sensitivities in the two directions of deflection, distortions due to the non-coincidence of the axially displaced centers of deflection, increased over-all dimensions, and other inconveniences.

The basic difficulty can be seen in the fact that whereas the forces generated by magnetic fields are inherently superposable owing to the absence of any physical support for the sources of the magnetic field, the forces created by an electric field require the presence of physical supports for the charges which constitutes the sources of the field, and hence two or more electrostatic fields cannot co-exist without interacting and distorting one another. Otherwise stated, whereas two simultaneously present magnetic fields will accurately combine in accordance with the law of vector summation, an electric field created by two simultaneously acting pairs of electrodes cannot be derived by vectorial combination of two fields respectively created by one pair of electrodes in the absence of the other pair. Earlier attempts at providing a simultaneously-acting, or biaxial, electrostatic deflector, have accordingly relied on the provision of a multiplicity of separate plate electrodes extending along the length of the deflector device and so contoured and interleaved with one another in both the axial and circumferential senses as to simulate the desired cosine distribution of electric fields conductive to an approximately correct vector addition of differently directed field forces. The resulting pattern of electrode plates required to achieve this purpose is very intricate, the contouring and dimensioning of the various electrode portions is highly critical requiring close tolerances in manufacture, and leading to delicate calibration and adjustment problems.

Objects of this invention include the provision of improved biaxial electrostatic deflector systems that will be simple and economical to construct, calibrate and adjust, permitting of relatively wide tolerances in fabrication, and will nevertheless provide for an efficient biaxial deflection of increased deflection sensitivity and substantially distortion-free for a wide angular range of deflections.

The invention is based on the finding that correct vector summation of electrostatic deflection forces can be simulated, and efficient biaxial electrostatic deflection consequently be obtained, to within an excellent degree of approximation amply adequate for all practical applications, by exposing the charged particles to the normal deflecting action of coextensive pairs of opposed electrostatic deflection plates axially extending continuously over a major axial region of the deflection device, and subjecting the particles to a corrective deflection by the action of auxiliary electrodes interspersed circumferentially with the main electrodes within a minor axial region of the device, conveniently situated near the exit end of the deflection device. The auxiliary electrodes may be connected to a common potential. It has been found that adjustment of this common potential will modify the deflection-correcting action over a wide range, so that the geometry of the device is not critical. As a result the improved biaxial electrostatic deflecting device is simple, inexpensive and practical.

Exemplary embodiments of the invention will now be described with reference to the accompanying drawings, wherein:

FIG. 1 is a perspective view of one form of the improved biaxial electrostatic deflector unit;

FIG. 2 is a developed view thereof;

FIGS. 3a, 3b and 3c are fragmentary cross sectional views illustrating respective modifications;

FIG. 4 is a perspective view of another embodiment of the biaxial electrostatic deflector unit;

FIG. 5 is a developed view thereof;

FIG. 6 is a developed view of a further embodiment of the invention;

FIG. 9 is a cross sectional view of a deflector unit according to the embodiment of FIGS. 1 and 2, taken on a plane in the minor axial region of the auxiliary electrodes;

FIG. 10 is a graph similar to FIG. 8 relating to the cross section of FIG. 9;

Figure 7:
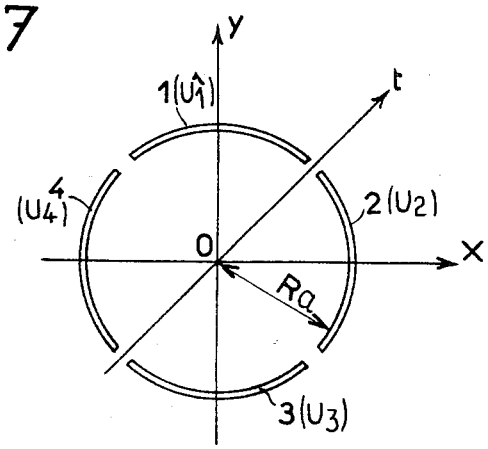
FIG. 7 is a schematic cross sectional view of a deflector unit according to any one of the embodiments of the preceding figures, the cross section being taken on a plane positioned in the major axial region ahead of the auxiliary electrodes.

Referring to FIGS. 1 and 2, and electrostatic deflecting unit according to one form of the invention, generally designated D, is of generally frustoconical shape flared in the direction of flight of the particles, e.g. electrons with a cone angle preferably somewhat less than 30°. The unit D includes four main electrodes 1, 2, 3, 4 of segmental cross section, here shown as being of equal circumferential extent, and separated by narrow slots extending on the generatrices of the frustoconical surface. In operation, as will be later described, a first control voltage is applied across the main electrodes 1 and 3 of one diametrically opposite pair and another control voltage is applied across the main electrodes 2 and 4 of the other pair. Each of the main electrodes is formed with a cutout 11 in the end of it situated at the larger-radius end of the structure, such cutouts 11 being here shown as of generally trapezoidal shape. Projecting into the cutouts 11 of the four mail electrodes 1, 2, 3, 4 are auxiliary electrodes 5, 6, 7 and 8, of a shape corresponding to that of the cutouts and are separated from the main electrodes by intervening slots. All four auxiliary electrodes 5, 6, 7, 8 are electrically interconnected by way of an annular conducting portion 15 here shown as positioned at the outer terminal rim of the structure D.

The deflector unit D may conveniently be constructed in the form of a frustoconical tube of insulating material, e.g. glass or ceramic with the main and auxiliary electrodes being provided in the form of conductive metal coatings deposited over the inner surface of the tube by any suitable metal coating technique. The separating slots between the electrodes may be etched by photo-engraving or the like. In such an arrangement, it will be evident that the auxiliary electrodes 5, 6, 7, 8 will lie on the same conical surface as the main electrodes, as shown in exaggerated form in FIG. 3a where 16 designates part of the insulating supporting tube. It is found however that such an arrangement is not essential, and as shown in FIGS. 3b and 3c the auxiliary electrodes such as 5 may be positioned radially outward or radially inward of the surface defined by the main electrodes such as 1. Also, FIG. 3c indicates that the main electrodes are not necessarily arcuate and coaxial with the main electrodes, but may assume other shapes, e.g. flat as shown.

Referring to FIG. 2, the axial length 9 of the main electrodes as measured on a generatrix of the conical surface may be from three to four times the average width 10, thereof. The auxiliary electrodes may have a developed width 12 as measured around the end periphery of the conical surface from about one fourth to one half the developed width 13 of the main electrodes and said auxiliary electrodes may have a length 14 somewhat greater than one seventh the length 9 of the main electrodes, and preferably not exceeding about ⅓ of said length.

The electrodes 1 through 8 may be provided, rather than in the form of deposited coatings as indicated above, in the form of metal plates if preferred.

In explaining the operation of the invention as so far described, we shall first consider the electrical conditions obtaining within the conical deflector tube D (FIG. 1), within a cross section thereof positioned in the major axial region ahead of the auxiliary electrodes, such a cross section being schematically shown in FIG. 7. In that figure, the orthogonal coordinate axes $x$ and $y$ extending through the circumferential midpoints of the electrode pairs may for convenience be thought of as horizontal and vertical respectively. Also indicated is an axis $t$ which bisects the $x$ and $y$ axes at a position of 45°. The radius of the tubular unit at the cross section under consideration is indicated at $Ra$. The potentials applied to the respective main electrodes are called $U_1$, $U_2$, $U_3$, $U_4$.

Each of the four electrode potentials can be considered as including a constant component $U_0$, serving to accelerate the particles, e.g. electrons, in the axial direction, and a variable component serving to accelerate the electrons in a radial direction, i.e. a deflecting voltage component, termed $u$. It is evident that if the potentials applied to the pair of horizontal-deflection plates 2 and 4 are the same, and the potentials applied to the vertical-deflection pair 1–3 are different, an electron travelling in the axial direction through the tube will be subjected to a purely vertical deflecting action and will be deflected radially along the vertical axis $Oy$. Conversely of course, if only the potentials between the horizontal plates 2 and 4 differ, the deflection will proceed along the horizontal axis $Ox$. If equal voltage differences are applied between the two pairs of plates 1–3 and 2–4, the radial deflection of the electron should, in theory, take place along the bisecting axis $Ot$.

Figure 8:
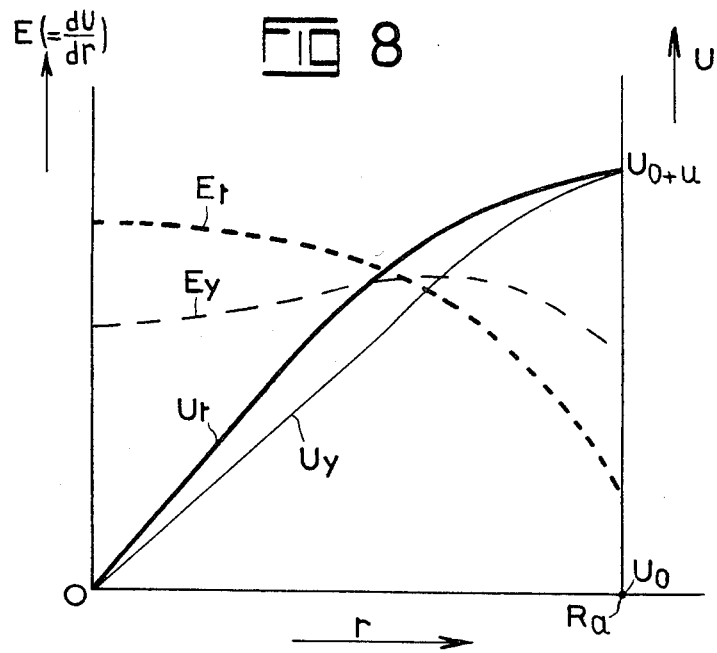
FIG. 8 is a graph showing the variations of various electrical magnitudes with radial distance in the cross section of FIG. 7.

Consider now the distribution of the electric potentials over the cross section of the tube, at varying radial distances from the tube axis $O$. In the graph of FIG. 8, the abscissae indicate radial distances as $r$, from O to R, and the ordinate axis U at the right of the graph indicates electrical potentials in arbitrary units for the various values of $r$. Two cases are considered in the graph. The first case relates to the purely vertical deflection mentioned above, for which purpose the plate potentials are given the following values:

$$U_1 = U_0 + u, \quad U_3 = U_0 - u, \text{ and } U_2 = U_4 = U_0 \quad (1)$$

As indicated above, with such values of plate potentials, an electron will be subjected to a deflecting force in the vertical direction $Oy$. When the values of the potential $U_y$ along the $Oy$ axis are considered at different radial distances $r$, theory and experiment show that the variations of $U_y$ follow a curve substantially as indicated in full lines at $U_y$ in FIG. 8. The meaning of curve $U_y$ is that with a set of plate potentials as indicated by Equation 1, the resulting potential present at the tube axis O is zero, and said resulting potential increases to $(U_0+u)$ at a point directly adjacent the upper plate 1.

As is well-known in electrodynamics, the accelerating force acting on a charged particle is proportional not to the electric potential but to the electric field to which the particle is exposed. The electric field, or voltage gradient, is given by the rate of change of the voltage with distance, i.e. $E=dU/dr$. In FIG. 8, the variations of electric field $E_y$ along the Oy axis for the set of plate potentials of Equation 1, with radial distance, are indicated by the dashed-line curve $E_y$. It may be noted that for any value of $r$, the ordinate of the curve $E_y$ represents the slope at the corresponding point of curve $U_y$, as indicated by the equation $E_y=dU_y/dr$.

The second case considered in FIG. 8 is the case of 45° deflection along the Ot axis. For this purpose the plate potentials must be given the following values:

$$U_1=U_2=U_0+u; \text{ and } U_3=U_4=U_0-u \quad (2)$$

The heavy-line curves $U_t$ and $E_t$ indicate the variations of electric potential and field, respectively, with radial distance in the Ot direction, with the set of plate potential values given by Equation 2.

In order that an electrostatic deflector unit of the type to which the invention relates shall operate properly and not introduce distortion into the raster scanned by the beam of electrons or other particles, the unit must satisfy the condition that the deflection forces applied to a particle in different directions shall add up vectorially. In particular, this means that the resultant force applied to a given particle as the result of two equal electric voltages applied in mutually orthogonal directions, must be $\sqrt{2}$ times greater than the force acting on the particle as the result of an equal electric voltage applied in a single one of said directions. When this statement is referred to the two cases considered above in the graph of FIG. 8, it is readily seen that proper operation of the system required that the ratio $E_t/E_y$ of the electric fields created with the respective sets of potential values defined by Equations 1 and 2, should equal $\sqrt{2}$, for all values of the radial distance $r$.

Figure 13:
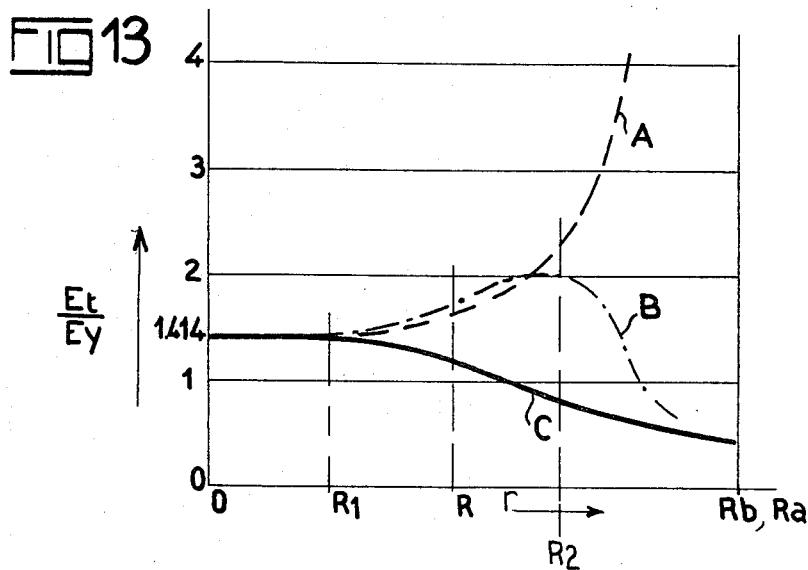
FIG. 13 is a graph showing the variation of a further electrical magnitude as a function of radial distance, and illustrating the deflection-correcting action introduced in accordance with the invention for each of two main forms of embodiment discussed.

The condition is not satisfied with the system of four main electrodes 1, 2, 3, 4 shown in FIG. 7. Thus, FIG. 13 indicates as the full-line curve C the variations of the ratio $E_t/E_y$ with radial distance $r$. It is seen that this ratio remains equal to $\sqrt{2}$, as required, for a short radial distance $r$ from the tube axis O, but then falls off rapidly as the radial distance $r$ of the particle under consideration increases to the maximum radius value $R_a$. Such a condition would distort a rectangular scanning raster of a cathode ray tube electron beam (e.g. in a television tube) in the manner indicated by the barrel-shaped contour 17 in FIG. 14. As shown in that figure, the scanning raster produced by the beam instead of assuming the correct rectangular shape indicated at 100, is distorted to the barrel-shaped contour 17 owing to the above-mentioned falling-off of the $E_t/E_y$ ratio below the true $\sqrt{2}$ value at positions remote from the tube axis, as shown in FIG. 13.

According to the present invention, this situation is corrected through the provision of the auxiliary or compensating electrodes 5 through 8 positioned in a minor axial region near the output end of the deflector unit. As will presently be shown, the auxiliary electrodes apply corrective deflecting actions to the particles during the ultimate part of their flight paths, so as to compensate substantially for the erroneous deflections to which the particles were exposed over the major, initial, section of their flight trajectories through the deflector unit.

FIG. 9 shows a cross section of the improved deflector device D of FIG. 1 axially positioned near the exit end of the device so as to include the auxiliary or compensating electrode portions 5 through 8. In operation, these auxiliary electrode portions are carried to a common potential $U_c$ somewhat lower than the potential $U_0$.

As shown in the graph of FIG. 10, the shapes of the curves $U_t$, $U_y$, $E_t$ and $E_y$ relating to the cross section of FIG. 9 are then considerably altered as compared to the shapes of the corresponding curves shown in FIG. 8 in the absence of the auxiliary electrodes. Both potential curves start off at a common value somewhat less than $U_0$ at the center of the tube. The $U_t$ curve then increases continuously up to the final value $(U_0+u)$ adjacent the periphery of the tube, as in FIG. 8. The $U_y$ curve however, in this case rises to a maximum and then decreases to the value $U_c$ adjacent the auxiliary electrode 5, as will be evident from a consideration of the Oy axis in FIG. 9 since $U_c$ is the common potential of the auxiliary electrodes. The electrostatic field curve $E_t$ and $E_y$ are seen to have corresponding shapes, with the $E_y$ curve decreasing to a large negative value adjacent the auxiliary electrode.

The field ratio $E_t/E_y$ in this case consequently varies as indicated by the curve A in FIG. 13. The ratio is initially equal to $\sqrt{2}$ for small values of radial distance $r$ as in FIG. 8, but then rises sharply to an infinite value corresponding to the point where the vertical field curve $E_y$ crosses the $U_0$ axis (FIG. 10), for a relatively large value of $r$. This rising branch of the field ratio curve A produced jointly by the main and auxiliary electrodes in the minor terminal region of the unit, will effectively compensate for the drooping branch of the field ratio curve C produced by the main electrodes alone in the initial major axial region of the unit, so as to impart the correct overall value of deflection to the particles over a large range of radial distances of said particles from the center axis of the device.

More in detail, if one considers particles traveling through the device and situated at a radial distance less than the value indicated as $R_1$ in FIG. 13, then such particles are correctly deflected by the action of the main electrodes 1–4 as the particles travel through in the major initial axial length of the unit, since in respect to such particles curve C indicates that the $E_t/E_y$ ratio has the correct value $\sqrt{2}$. Such particles, on entering the terminal section of the unit where the deflecting force is described by the curve A, are not subjected to any additional compensatory action since curve A indicates that the $E_t/E_y$ ratio in respect to those particles still has the same value $\sqrt{2}$. However, a particle that is situated at a radial distance such as R greater than $R_1$, would be deflected by the main electrodes in the first part of its travel by too small an amount, since the corresponding ordinate on curve C is seen to be less than $\sqrt{2}$. As such a particle enters the terminal part of the device in the reach of the auxiliary electrodes, it is exposed to a deflecting force of substantially increased value as indicated by the corresponding ordinate on curve A, and thereby sustains an additional outward deflection. The total radial deflection sustained by the particle under the action first of the main electrodes alone, then of the main and auxiliary electrodes jointly, can by a suitable choice of the electrode geometry and potential $U_c$ be made to take on the correct value required to prevent the distortion that would otherwise arise in the scanning raster. These conditions will hold for particles positioned at a radial distance from the tube axis not greater than a certain value $R_2$. For a practical tube construction according to FIG. 1, $R_2$ is found to represent from about 0.5 to 0.7 times $R_a$, the maximum tube radius. For the same tube, the value $R_1$ is about $0.25R_a$. The increase in useful deflection range thus obtained through the provision of the auxiliary electrodes 5–8 of the invention, can therefore be seen to make the whole difference between an inoperative and an operative biaxial electrostatic deflection unit.

It should in this connection be noted that the non-operability of the improved deflection unit for radial deflection values $r$ greater than $R_2$ does not practically represent a deficiency of the system, since in any electrostatic deflecting device of this general class there exists a discontinuity of potential between adjacent electrostatic deflector plates, as a result of which the deflections must be kept from exceeding a maximum value generally similar to the value $R_2$ indicated above.

The above reasoning assumed a maximum value of the deflecting voltage $u$, and the diagrams of FIGS. 10 and 13 were made on that assumption. It will be apparent that the reasoning holds with greater force for deflecting voltages less than $u$, since such lower deflecting voltages will tend to keep the particles at smaller radial distances $r$ from the tube axis, where the field ratio has in any case the correct value for preventing distortion, as was explained above.

It will be understood from the foregoing that the effectiveness of the correcting action achieved in the system of the invention depends on the configuration of the field ratio curve such as A, FIG. 13, produced by means of the auxiliary electrodes. The shape of this curve in turn depends both on the geometry of the tube components, particularly the relative shape and dimensioning of the auxiliary electrodes, and on the common potential $U_c$ applied to the latter. It is found in practice that for widely differing electrode geometries, it is possible to determine a suitable value for the potential $U_c$ which will accomplish the desired wide-range correction. The essential condition is that there be provided in a minor region of the tube, auxiliary electrodes at the common potential $U_c$, interspersed or intercalated with the main deflector plates around the circumference of the tube. FIGS. 1 and 2 described above represent one suitable geometry satisfying this condition, and other suitable geometries will be presently described. In all cases, a convenient practical procedure for determining the proper value of the compensating potential $U_c$ involves continuously varying the potential applied to the auxiliary electrodes from a low minimum value while observing the scanning raster or image produced on a screen by the beam of electrons or other particles. As the common correcting potential applied to the auxiliary electrodes is progressively increased the image will gradually deform from the barrel-shaped distorted form 17 earlier mentioned, through the straight square shape 100 to the sharp-cornered form 18. The value of said potential indicated when the observed image has substantially the square shape 100 is the optimum value $U_c$ to be selected for the particular electrode geometry being tested.

It is therefore apparent that the device of the invention is extremely simple to adjust and calibrate.

In the embodiment illustrated in FIGS. 4 and 5, the biaxial electrostatic deflection unit of the invention comprises a frusto-conical tubular unit generally similar to that of FIGS. 1 and 2, with main deflector electrodes 1, 2, 3, 4. The auxiliary electrode means in this case comprise the four projecting sections 19, 20, 21, 22, electrically interconnected by the annular conductor 15. The projecting electrode sections 15–19 are of generally triangular shape and project into correspondingly shaped notches or cutouts defined between adjacent sides of the main electrodes 1–4 in the output terminal region of the deflector unit.

As shown in FIG. 5 the dimensions 9, 10 and 14 of the main and auxiliary electrodes may be similar to the correspondingly designated dimensions in the first embodiment. The width 12 of each auxiliary electrode measured at the terminal circumference of the unit may be in the range of from ½ to ⅗ of the corresponding width 13 of the main electrodes. The radial positioning of the auxiliary electrodes relative to the main electrodes may be similar to any of the arrangements described with reference to FIGS. 3a, 3b or 3c.

Figure 11:
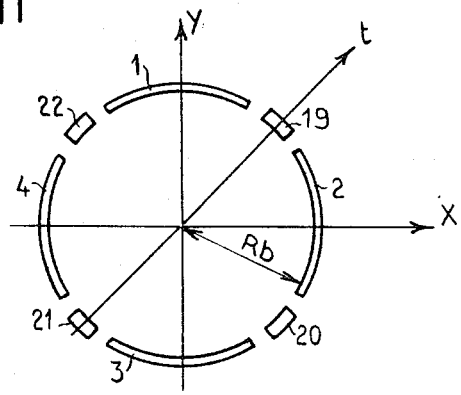
FIG. 11 is a cross sectional view similar to FIG. 9 but in the case of the embodiment of FIGS. 4 and 5.
Figure 12:
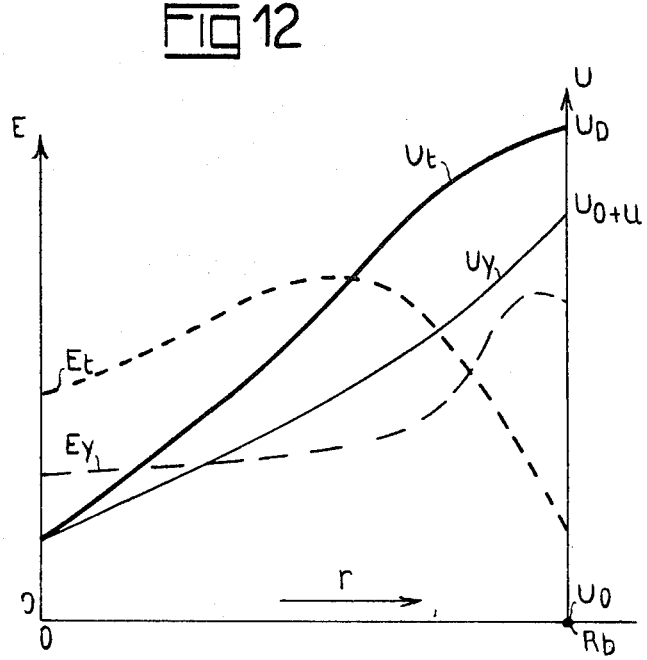
FIG. 12 is a graph similar to FIG. 8 or FIG. 10 relating to the cross section of FIG. 11.

In operation, the auxiliary electrodes 19, 20, 21, 22 of this embodiment are carried to a common potential $U_d$ higher than the accelerating potential $U_0$ of the main electrodes, instead of being lower than $U_0$ as in the first embodiment. The electrical conditions obtaining in the deflector unit ahead of the inner tips of the auxiliary electrodes are described by the charts of FIGS. 7 and 8 as in the first embodiment, as will be readily understood. The electrical conditions obtaining in any cross section intersecting the auxiliary electrodes 19–22, i.e. in the terminal region of the deflector unit, such cross section being schematically shown in FIG. 11, are as represented approximately by the chart of FIG. 12. Both potential curves $U_t$ and $U_y$ are seen to be raised somewhat above the $U_0$ value at the center axis. The $U_y$ curve then rises continuously to the potential value $(U_0+u)$ adjacent the surface of a main electrode such as 1, whereas the $U_t$ curve rises continuously to the higher potential value $U_d$ adjacent an auxiliary electrode such as 19 (see FIG. 11). It is found that the electric field ratio $(E_t/E_y)$ in the terminal region of the unit then varies with radial distance $r$ in the manner indicated by the curve B in FIG. 13. It will be seen that curve B has a shape closely similar to that of curve A for all moderate radial distances $r$ up to a value approximating the maximum deflection radius $R_2$ at which the system is operative as earlier described. The operation of the embodiment of FIGS. 4–5, therefore, is very similar to the operation of the first described embodiment and will not be described again.

Figure 14:
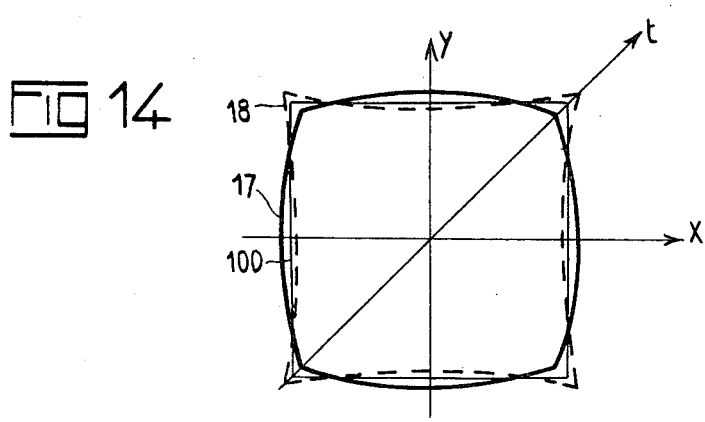
FIG. 14 is a schematic front view of scanning raster contours having various distorted and undistorted shapes.

FIG. 6 illustrates in developed view an embodiment of a biaxial electrostatic deflector device according to the invention, which constitutes in a sense a combination of the first two embodiments described. The main electrodes 1, 2, 3, 4 are seen to be formed at their wider, output, ends, with trapezoidal cutouts as in FIGS. 1–2, and with angular notches between their adjacent sides, as in FIGS. 4–5. A first set of auxiliary electrodes 5, 6, 7, 8 of generally trapezoidal shape are positioned within the trapezoidal cutouts and are all interconnected by an annular conductor 15 adjacent the outer end of the unit. A second set of auxiliary electrodes 19, 20, 21, 22 are positioned within the angular notches and are all interconnected by way of straight connection 24 extending along generatrices positioned between the adjacent sides of the main electrodes, and an annular conductor 23 positioned adjacent the input end of the unit, having all the straight conductors 24 connected to spaced points thereof. The electrodes and connecting means shown in FIG. 6 are particularly well suited for construction by photo-etching processes, but various other arrangements and fabrication methods may be used. In operation, the common conductor 15 interconnecting the electrodes 5–9 is connected to a potential $U_c$ lower than the accelerating potential $U_0$, while the common conductor 23 interconnecting the electrodes 19–23 is connected to a potential $U_d$ higher than the accelerating potential $U_0$, as will be understood from the foregoing description of the first and second embodiments. In calibrating and adjusting a deflecting unit constructed in accordance with FIG. 6, a procedure generally similar to that described for the first embodiment may be used, with the two correcting potentials $U_c$ and $U_d$ being separately adjusted successively or simultaneously, or again in alternation by increments, until the scanning image on the screen has been adjusted to the accurately squared shape 100 (FIG. 14).

The embodiment of the invention just described with reference to FIG. 6 is of especial advantage in that it permits of more closely fitting the corrective actions of the two different sets of auxiliary electrodes by the separate adjustment of the correcting potentials $U_c$ and $U_d$ in order to achieve a highly effective overall correcting action over a wide range of radial deflection angles.

Figure 15:
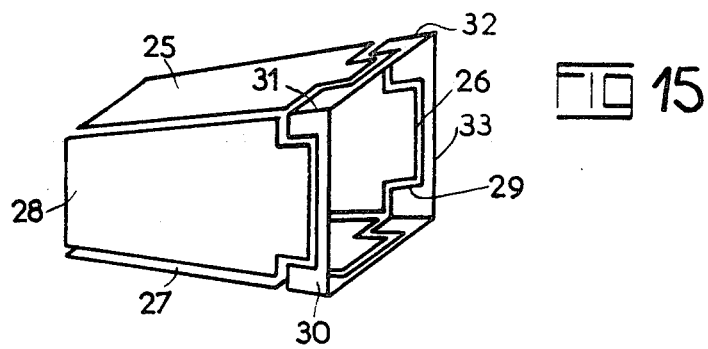
FIG. 15 is a perspective view of a further embodiment of the improved biaxial deflector unit.

FIG. 15 illustrates a further construction of the improved biaxial electrostatic deflector, in which the unit has flat rather than arcuate electrodes. The unit shown is of flared frusto-pyramidal shape, with the four flat main electrodes 25 through 28. The auxiliary electrode means are here shown as including the four generally rectangular corner sections 29 through 32 projecting into corresponding cutouts defined between adjacent sides of the main electrodes and interconnected by a conductive frame 33 connectable to a common potential, which in this case would be higher than the accelerating potential applied to the main electrodes. It will be noticed that topologically, the arrangement thus described with reference to FIG. 15 is similar to the arrangement of FIGS. 4–5. It will be evident however that the construction of FIG. 15 can easily be modified so as to correspond topologically with the arrangement of FIGS. 1–2 instead, in which case the common conductive frame 33 would be connected to a potential lower than the accelerating potential. Also, the general construction of FIG. 15 can be used in an arrangement involving two separate sets of auxiliary electrodes as described with reference to FIG. 6. FIG. 6 in fact can be regarded as a developed view of such a frusto-pyramidal construction just as it can be looked upon as the developed view of a frusto-conical construction.

The flat-side construction of FIG. 15 is especially well-suited for cases where the electrodes are made of self-supporting elements of metal sheet. It is found that the correcting potentials ($U_d$ and/or $U_c$) applied to the auxiliary electrodes in a flat-sided deflection unit of the general type shown in FIG. 15 should, for equal results, be somewhat higher in absolute value than the corresponding potential applied in the circular connstructions earlier described herein.

In all of the embodiments of the invention so far disclosed, the pairs of electrodes used are of equal transverse extent or width, thereby providing for equal deflection sensitivity in both orthogonal (horizontal and vertical) directions, and producing a square scanning raster on a cathode ray tube screen as shown in FIG. 15, when equal sweep voltages are used in both directions. It is of course wholly feasible to make the pairs of electrodes unequal in width, to provide for different deflection sensitivities in the two directions, should this be desired. For example, in image analyzer tubes it is often found desirable to produce an oblong rectangular image while using sawtooth sweep voltages of equal amplitudes in both directions. In any such situation it would simply be necessary to make one pair of main electrode plates of wider transverse extent than the other pair, in any one of the embodiments disclosed herein. For example in the flat-sided construction of FIG. 15, the unit may be made in the form of a frustum of a pyramidal with a rectangular, rather than square, base, with the upper and lower side electrodes 25 and 27 being of one transverse width, and the other electrodes 26 and 28 of another, e.g. narrower width, in a ratio preferably not exceeding ¾. With equal-amplitude sawtooth sweep voltages applied to the respective pairs of plates in such a unit, the scanned image will be a vertically elongated rectangle (since the electric field is weaker along the major direction of the rectangle).

Further, in all of the embodiments disclosed the deflector units are shown as being of diverging or flared configuration in the direction of particle travel. While such a configuration is found generally to increase the sensitivity and the useful deflection range achievable, it would lie within the scope of the invention to provide the unit of uniform cross section along its length, in any of the construction described. Thus, the units may be in the general form of cylinders or prisms, rather than the cone or pyramid frustrums shown.

Figure 16:
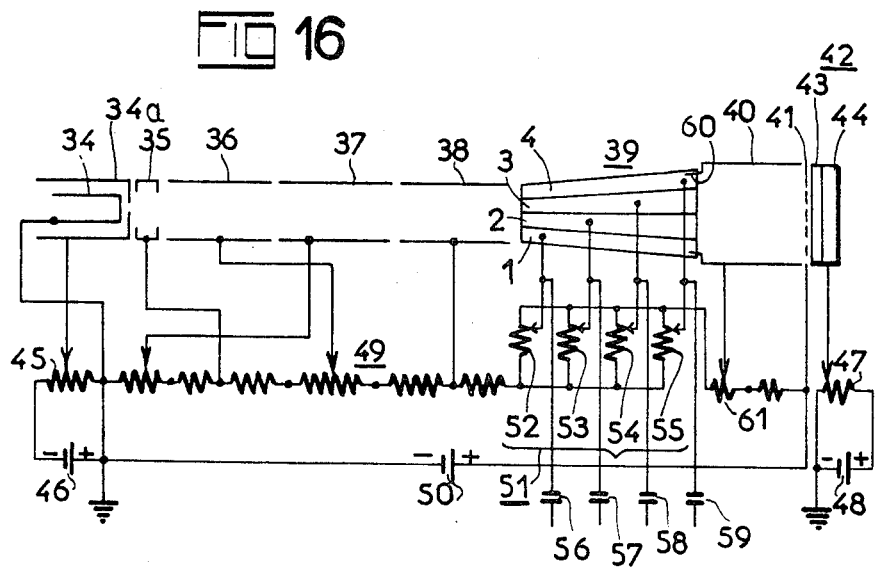
FIG. 16 is an electrical diagram illustrating an image analyzer tube assembly embodying a deflector unit according to the invention together with its power supply circuitry.

Biaxial electrostatic deflectors constructed according to the invention can be incorporated in a great variety of types of apparatus. As one example, FIG. 16 illustrates an image analyzer tube of the photoconduction type embodying a deflector unit of the invention. The tube assembly includes an electron gun section including a cathode 34 and control electrode 34a, followed by an accelerator electrode 35 and a drift and focussing section including the electrodes 36, 37 and 38, all of the above components being generally conventional. Positioned beyond the focusing electrode 38 is a biaxial electro-static deflector unit generally designated 39, e.g. of the type shown in FIGS. 4 and 5, schematically shown as including the four main electrodes 1–4 spread out flat, and auxiliary electrodes indicated at 60. Following the deflector is a collimator and post-acceleration section including a tubular cylindrical electrode 40 and grid 41, finally a target section 42 including a photosensitive layer 43 and signal plate 44.

A D-C supply unit for the analyzer tube is shown as including three D-C sources 46, 48 and 50. Source 46 supplies a suitable adjustable potential to the control electrode 34a relatively to the grounded cathode by way of a potentiometer 45. Source 48 supplies an adjustable voltage by way of a potentiometer 47 to the signal plate 44. Source 50 supplies D-C potentials to the remaining electrodes of the system by way of a series array of potentiometers and resistances generally designated 49, having taps respectively connected to accelerator electrode 35 and focalizing electrodes 36, 37 and 38, and a potentiometer 61 connected to the electrode 40. Also connected across source 50 in series with the series-array 49 and 61 is a parallel combination of four potentiometers generally designated 51, including the four potentiometers 52 through 55 respectively connected to the four main electrodes 1 through 4 of deflector unit 39 of the invention for applying the constant voltages ($U_0$) thereto. Said main electrodes are further connected by way of capacitors 56 through 59 with conventional sawtooth sweep generators, not shown, for applying the variable voltages ($u$). The auxiliary electrodes 60 of the deflector unit are here shown connected to the common potential of the output electrode 40. While it has been found satisfactory to use a common potential both for the auxiliary electrodes of the deflector of the invention and the initial collimating and post-accelerating electrode 40, and therefore connect the auxiliary electrodes 60 with electrode 40 as here shown, a separately adjustable potential may be applied to said auxiliary electrodes if desired.

In adjusting the auxiliary electrode potential of the tube shown in FIG. 16, the procedure earlier described herein may be used, potentiometer 61 being progressively adjusted until a true rectangular image is obtained on the screen.

The following set of exemplary voltage values have been found satisfactory for application to the various components of the tube assembly of FIG. 16 in one practical embodiment thereof:

| Electrode designations: | D-C potential, volts |
|---|---|
| Cathode 34 | 0 |
| Control electrode 34a | −100 to −20 |
| Accelerator electrode 35 | 300 |
| Drift and focus electrodes: | |
| 36 | 500 |
| 37 | 150 |
| 38 | 500 |
| Main deflector electrodes 1–4 | $U_0$=500 |
| Auxiliary electrodes 60 and electrode 40 | $U_d$= 00 |
| Grid 41 | 1000 |
| Signal plate 44 | 50 |

Biaxial electrostatic deflection systems constructed according to the invention have been found to operate very efficiently and provide deflection sensitivity values higher by 30% or more than the sensitivity obtainable with biaxial electrostatic deflector units of the prior art, having similar over-all dimensions. Practical deflection angles greater than 40% are readily achievable without substantial ditsortion. The construction, calibration and adjustment of the deflector are considerably simpler and more economical than in the case of said prior art units. The range of adjustment of the common potential of the auxiliary electrode means (the potentials here tremed $U_c$ and/ or $U_d$) provides a means of easily taking up dimensional variations in the geometry of the electrodes, thus increasing manufacturing tolerances.

What I claim is:

1. A biaxial electrostatic device for charged particles comprising:
   two pairs of opposed main deflection electrodes extending in a generally axial direction about a center axis defining a direction of travel for a beam of said particles;
   means for applying respective voltages across the electrodes of the respective pairs to create electrostatic fields for deflecting said particles in mutually-orthogonal directions transverse to said axis;
   said main electrodes extending substantially continuously in the axial direction over a major axial region of the device from an input end to a position short of the exit end of the device;
   further electrode means including electrically interconnected portions extending in circumferentially interspersed relation with said main electrodes over a minor axial region between said position and said exit end of the device and electrically isolated from the main eletcrodes; and
   means for applying a common correcting potential to said auxiliary electrode means to create distortion-correcting electrostatic fields present over said minor axial region to impart corrective deflections to the particles concurrently with the deflections imparted thereto by said first-mentioned electrostatic fields before the particles issue from said exit end of the device, whereby the over-all deflections imparted to said particles will be substantially the vector sums of the deflections imparted by said first-mentioned electrostatic fields respectively in said two mutually orthogonal directions.

2. A device according to claim 1, wherein the auxiliary electrode means includes a conductive, generally annular, interconnecting member extending generally around the exit end of the device for connection with said correcting potential.

3. A device according to claim 1, wherein said minor axial region is longer than about one seventh of the total axial length of the device.

4. A device according to claim 1, wherein said auxiliary electrode portions have a combined width of about from one fifth to one half the total transverse peripheral length of the exit end of the device.

5. An electrostatic deflection device for charged particles comprising:
   two pairs of opposed main deflection electrodes extending in a generally axial direction about a center axis defining a direction of travel for a beam of said particles;
   means for applying respective voltages across the electrodes of the respective pairs to create electrostatic fields for deflecting said particles in mutually-orthogonal directions transverse to said axis;
   said main electrodes extending substantially continuously in the axial direction over a major axial region of the device from an input end to a position short of the exit end of the device, and having cutouts formed in said exit ends thereof;
   auxiliary electrode means including electrically interconnected portions projecting into said cutouts of the main electrodes from said exit ends, whereby to extend in circumfernetially interspersed relation with said main electrodes over a minor axial region between said position and said exit end of the device, said auxiliary electrode means having their edge electrically isolated by relatively narrow gaps from the edges of the main electrodes; and
   means for applying a common correcting potential to said auxiliary electrode means to create distortion-correcting electrostatic fields present exclusively over said minor axial region to impart corrective deflections to the particles just before the particles issue from said exit end of the device.

6. A device according to claim 5, wherein said cutouts are formed centrally of the exit ends of the main electrodes, whereby each of said auxiliary electrode portions is laterally bounded on both sides thereof by a common main electrode, and said common correcting potential is substantially lower than a constant D-C potential applied to the main electrodes for axially accelerating the particles.

7. A device according to claim 5, wherein said cutouts are formed at the sides of the exit ends of the main electrodes, whereby each auxiliary electrode portion is laterally bounded by different adjacent main electrodes on the respective sides thereof, and said common correcting potential is substantially higher than a constant D-C potential applied to the main eletcrodes for axially accelerating the particles.

8. A device according to claim 5, wherein said cutouts include a first set of cutouts formed centrally of the exit ends of the main electrodes and a second set of cutouts formed at the sides of the exit ends of the main electrodes, and said auxiliary electrode means include a first set of electrically interconnected electrode portions projecting into said first cutouts and having a first corrective potential applied thereto, and a second set of electrically interconnected electrode portions projecting into said second cutouts and having a second corrective potential applied thereto.

9. A device according to claim 8, wherein said first correcting potential is substantially lower, and said second correcting potential is substantially higher, than a constant D-C potential applied to the main electrodes for axially accelerating the particles.

10. A biaxial electrostatic deflection device for charged particles comprising:
    a plurality of main deflection electrodes extending in a generally axial direction about a center axis defining a direction of travel for a beam of said particles;
    means for applying respective voltages to the respective main electrodes to create electrostatic fields for deflecting the particles in respective transverse directions;
    said main electrodes extending substantially continuously in the axial direction over a major axial region of the device;
    further electode means including portions circumferentially interspersed with said main electrodes over a minor axial region of the device and electrically isolated from the main electrodes; and
    means for applying a correcting potential to said auxiliary electrode means to create distortion-correcting electrostatic fields present exclusively over said minor axial region to impart corrective deflections to the particles concurrently with said deflections imparted thereto by said first-mentioned electrostatic fields travel past said minor axial region, whereby approximately to simulate a simultaneous biaxial deflection of said particles in said respective transverse directions.

11. A device according to claim 10, which is of generally flared configuration with said main electrodes diverging in the axial direction of particle flight.

12. A device according to claim 10, which comprises an evacuated tube of insulating material of generally circular cross section and wherein said main electrodes and auxiliary electrode means comprise metallic coatings deposited on the inner surface of said tube.

13. A device according to claim 10, wherein said main electrodes are generally flat sheet metal elements defining a structure of polygonal cross section about said axis.

14. An electrostatic deflection device according to claim 10 which forms part of an image analyzer apparatus, said apparatus including an electrode positioned beyond said device in the direction of travel of the charged particles, and wherein said auxiliary electrode means is connected to said electrode.

References Cited

UNITED STATES PATENTS

| | | | |
|---|---|---|---|
| 2,118,865 | 5/1938 | Schlesinger | 315—17 |
| 2,123,636 | 7/1938 | Schwartz | 313—78 |
| 2,212,396 | 8/1940 | Gabor | 315—17 |
| 2,453,647 | 11/1948 | Van Overbeek | 313—80 X |
| 2,781,171 | 2/1957 | Hagen | 313—78 X |
| 2,925,507 | 2/1960 | Keeran | 313—80 X |

RODNEY D. BENNETT, *Primary Examiner.*

M. F. HUBLER, *Assistant Examiner.*